US008731699B2

(12) United States Patent
Nagy et al.

(10) Patent No.: US 8,731,699 B2
(45) Date of Patent: May 20, 2014

(54) DYNAMIC, LEAN INSULATED GLASS UNIT ASSEMBLY LINE SCHEDULER

(75) Inventors: Akos Nagy, Zelienople, PA (US); Philip Plant, Zelienople, PA (US)

(73) Assignee: HP3 Software, Inc., Pittsburgh, PA (US)

( * ) Notice: Subject to any disclaimer, the term of this patent is extended or adjusted under 35 U.S.C. 154(b) by 687 days.

(21) Appl. No.: 12/893,824

(22) Filed: Sep. 29, 2010

(65) Prior Publication Data

US 2011/0238195 A1 Sep. 29, 2011

Related U.S. Application Data

(60) Provisional application No. 61/246,975, filed on Sep. 29, 2009.

(51) Int. Cl.
*G06F 19/00* (2011.01)

(52) U.S. Cl.
USPC .............................. 700/100; 700/157; 29/430

(58) Field of Classification Search
USPC .............................. 700/99-102, 157; 29/430
See application file for complete search history.

(56) References Cited

U.S. PATENT DOCUMENTS

| | | | |
|---|---|---|---|
| 3,537,944 | A | 11/1970 | Grubb et al. |
| 3,978,272 | A | 8/1976 | Donley |
| 4,098,956 | A | 7/1978 | Blickensderfer et al. |
| 4,434,024 | A | 2/1984 | Lisec |
| 4,534,841 | A | 8/1985 | Hartig et al. |
| 4,885,926 | A | 12/1989 | Lisec |
| 4,902,580 | A | 2/1990 | Gillery |
| 4,961,270 | A | 10/1990 | Lisec |
| 4,961,816 | A | 10/1990 | Lisec |
| 5,173,148 | A | 12/1992 | Lisec |
| 5,361,476 | A | 11/1994 | Leopold |
| 5,394,725 | A | 3/1995 | Lisec |
| 5,543,229 | A | 8/1996 | Ohsaki et al. |
| 5,640,828 | A | 6/1997 | Reeves et al. |
| 5,823,732 | A | 10/1998 | Lisec |
| 5,932,062 | A | 8/1999 | Manser |
| 6,038,825 | A | 3/2000 | Shah et al. |
| 6,068,720 | A | 5/2000 | McHugh |
| 6,148,890 | A | 11/2000 | Lafond |
| 6,279,292 | B1 | 8/2001 | Shah et al. |
| 6,306,525 | B1 | 10/2001 | Schicht et al. |
| 6,329,030 | B1 | 12/2001 | Lafond |
| 6,355,334 | B1 | 3/2002 | Rondeau et al. |
| 6,360,420 | B2 | 3/2002 | Shah et al. |
| 6,378,586 | B1 | 4/2002 | Lafond |
| 6,609,611 | B1 | 8/2003 | Lenhardt |

(Continued)

*Primary Examiner* — Mohammad Ali
*Assistant Examiner* — Nathan Laughlin
(74) *Attorney, Agent, or Firm* — Blynn L. Shideler; Krisanne Shideler; BLK Law Group

(57) ABSTRACT

A dynamic insulated glass unit (IGU) assembly line scheduler is provided for production control of an IGU assembly line. When calculating the IGU assembly line order and controls, the scheduler evaluates at least i) a changeable set of uniquely identifiable glass lite storage loading locations adjacent a loading station, ii) a changeable set of uniquely identifiable IGU storage locations adjacent a unloading station, iii) a changeable identifiable subset of the set of uniquely identifiable IGU storage locations, and iv) a assembly line change outs to be performed at least in the production of the IGUs for the next in line set of IGUs to be shipped from the IGU assembly line. The scheduler is configured to re-evaluate the IGU assembly order at least with the filling of each next in line set of IGUs to be shipped.

15 Claims, 1 Drawing Sheet

(56) References Cited

U.S. PATENT DOCUMENTS

| | | | |
|---|---|---|---|
| 6,650,478 | B1 | 11/2003 | DeBusk et al. |
| 6,793,971 | B2 | 9/2004 | Trpkovski |
| 6,823,644 | B1 | 11/2004 | Peterson |
| 6,838,159 | B2 | 1/2005 | Eby et al. |
| 7,063,893 | B2 | 6/2006 | Hoffman |
| 7,246,423 | B1 * | 7/2007 | Holden et al. .................. 29/430 |
| 7,449,224 | B2 | 11/2008 | Ensinger |
| 7,727,632 | B2 | 6/2010 | Kleideiter et al. |
| 7,758,915 | B2 | 7/2010 | Hoffman |
| 2007/0074803 | A1 | 4/2007 | Spotts |
| 2007/0112451 | A1 * | 5/2007 | Clayton et al. ................ 700/100 |
| 2008/0134627 | A1 | 6/2008 | Wilson |
| 2009/0014493 | A1 | 1/2009 | James |
| 2009/0107085 | A1 | 4/2009 | Catalano |
| 2009/0120018 | A1 | 5/2009 | Trpkovski |
| 2009/0120019 | A1 | 5/2009 | Trpkovski |
| 2009/0120035 | A1 | 5/2009 | Trpkovski |
| 2009/0120036 | A1 | 5/2009 | Trpkovski |

* cited by examiner

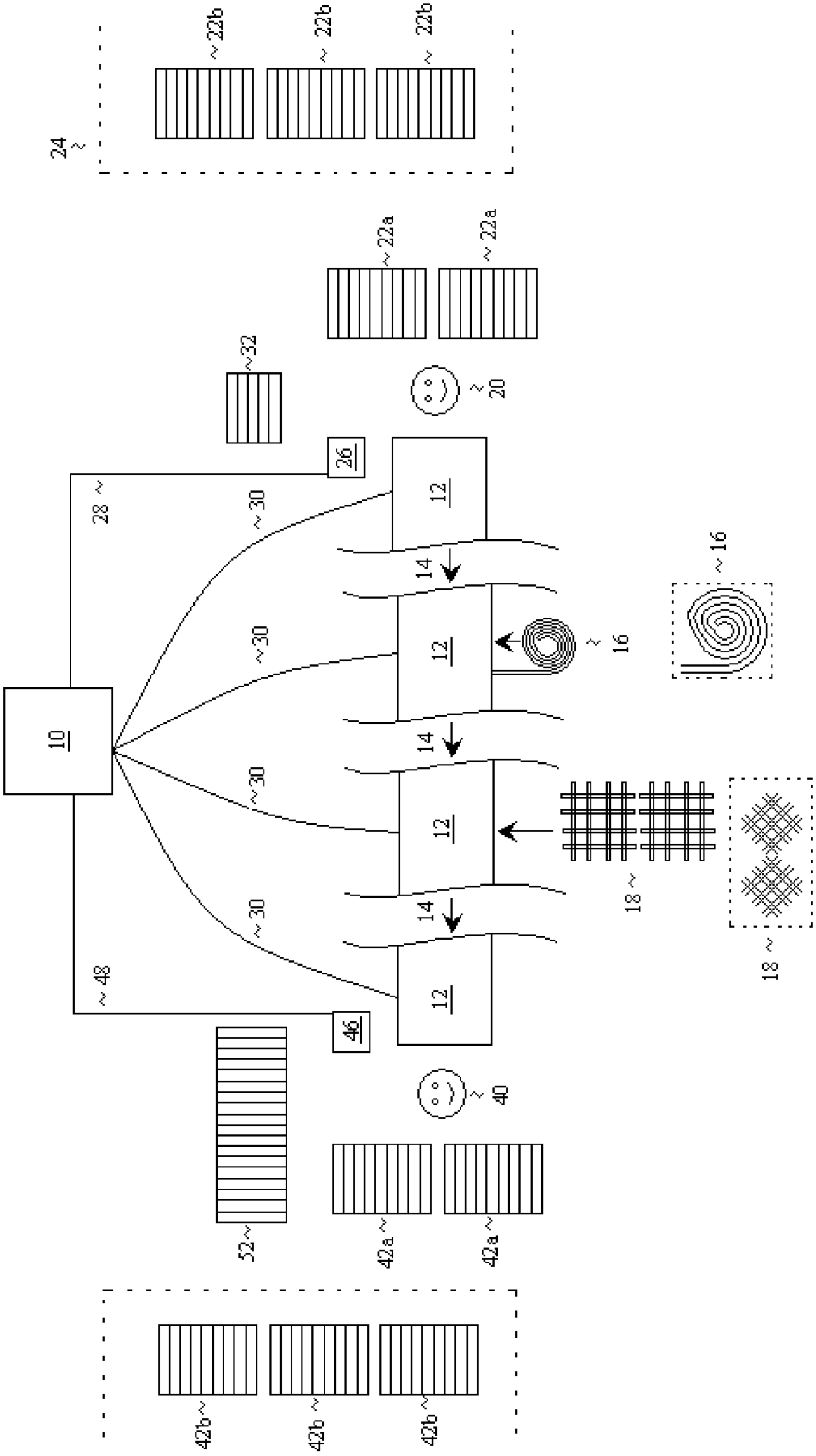
22b
22b
22b
24
22a
22a
32
20
26
28
30
12
14
16
16
10
18
18
48
46
40
52
42a
42a
42b
42b
42b

DYNAMIC, LEAN INSULATED GLASS UNIT ASSEMBLY LINE SCHEDULER

RELATED APPLICATIONS

The present application claims the benefit of provisional patent application Ser. No. 61/246,975, filed Sep. 29, 2009 entitled" Dynamic, Lean Insulated Glass Unit Assembly Line Scheduler

BACKGROUND OF THE INVENTION

1. Field of the Invention

The present invention relates to glass processing equipment with dynamic production control. Specifically, the invention relates to a dynamic, lean Insulated Glass Unit assembly line scheduler.

2. Background Information

Insulated Glass Units—IGU

Insulated glass units are formed by multiple glass panes or "lites" assembled into units. The units are also commonly referred to as merely insulated glass (IG), or insulated glass units (IGU) in the United States and Australia. They are also commonly referred to as double glazing, double glazed units in Europe. All of the terms or phrases reference a structure having multiple panes, typically of glass, or "lites" assembled into units. IGUs generally use the thermal and acoustic insulating properties of a gas, and/or partial vacuum, contained in the space between the lites formed by the unit. IGUs provide excellent insulation properties without sacrificing transparency. Transparency is generally a critical measurement in most such IGUs and is also referenced or measured as visual transmittance or VT. Commercially, most IGUs are "double glazed" meaning there are two panes or lites, but IGUs with three panes or lites (or more), i.e. "triple glazing" is becoming more common due to higher energy costs. For performance and evaluation standards see "ASTM E2190-08" which is the standard specification for "Insulating Glass Unit Performance and Evaluation".

IGUs may be framed in a sash, frame or in a curtain wall. IGUs are manufactured with glass lites typically in range of thickness from 3 mm to 10 mm, although greater widths are known for special applications. Laminated or tempered glass lites may also be used as part of the construction. Most IGUs are manufactured with the same thickness of glass lites used on both (or all) panes but special applications such as acoustic attenuation or security may require wide ranges of thicknesses for different panes to be incorporated in the same IGU.

While clear glass is the most common glass lite component of IGUs, tinted glass is be used in some IGUs to reduce solar heat gain or as an architectural feature. Other transparent material could also be used, but glass is certainly the most common. The principle colors available for tiniting the lites are bronze, gray and green. The degree of tint depends on both the composition of the glass and the thickness of the lite. Tinted glass is usually placed on the exterior of the IGU. The heat and sound insulation properties or scratch resistance or other properties of an IGUs may also be improved by the use of a film or coating applied to its surface. This film is typically made of polyester or metal, and may give the window a reflective appearance.

Further, Low-Emissivity Glass lites are also used in IGUs and is glass that has a thin coating, often of metal, on the glass within its airspace that reflects thermal radiation or inhibits its emission reducing heat transfer through the glass. A basic low-e coating allows solar radiation to pass through into a room.

There are two types of low-e coatings currently widely available, "hard-coat" and "soft-coat". See, for example, U.S. Pat. Nos. 3,537,944, 3,978,272, 4,098,956, 4,534,841, 4,902,580, 5,543,229, 6,306,525, 6,355,334, 6,650,478, 6,838,159, 7,063,893, 7,727,632, 7,758,915 which disclose various glass coatings and are incorporated herein by reference. Hard-coat glass lites are manufactured by applying molten tin to the glass surface as the glass sheets are being manufactured. The tin bonds to the surface of the glass and forms a relatively thick coating. Hard-coat glass lites are considered a medium performance coating since the emissivity is greater compared to the soft-coat product. One advantage of hard-coat glass is that it does not require special handling in the IGU assembly line to maintain the surface's coating integrity and does not scratch easily. It does require that the glass surface in contact with the spacer be abraded to improve adhesion of the sealant. Soft-coat glass uses vacuum deposition to apply a thin metallic coating to the glass surface as an additional manufacturing step. The coating is fragile compared to hard coat glass, requiring special handling and storage for both the manufacturing process and IGU fabrication. It has been suggested that selecting a soft-coat glass over a hard-coat glass improves thermal performance of the IGU by about 13%. Most low-emissivity glass sold for IGU manufacturing is of the hard-coat type.

The glass panes of an IGU are separated by a spacer. Most spacers are constructed of either thin gauge steel or aluminum for thermal expansion stability or cost reasons. The spacer may alternatively be constructed of fiberglass or use a hybrid design of metal and plastic. The spacer may further be filled with desiccant to remove moisture trapped in the air space during manufacturing, preventing condensation from forming on an inner glass pane surface when the temperature falls below the dew point. U.S. Pat. Nos. 5,361,476, 5,640,828, 6,360,420, 6,823,644, 7,449,224 and U.S. Patent Publication Numbers 2008-0134627, 2009-0107085, 2009-0120018, 2009-0120019, 2009-0120035, 2009-0120036, disclose spacer designs that are incorporated herein by reference.

IGU thickness is often a compromise between maximizing insulating value and the ability of the framing system used to carry the unit and weight concerns. These issues can be advantageously addressed with other considerations, for example, a perfect vacuum provides the most thermal insulation value. Alternatively, a technique called evacuated glazing can be used to drastically reduce heat transfer through convection and conduction. These IGUs have most of the air removed from the space between the panes, leaving a partial vacuum. Another alternative is to replace air in the space with inert gases such as argon, as argon has a thermal conductivity 67% that of air, or krypton, where krypton has about half the conductivity of argon, or even xenon to increase the insulating performance. These gasses have a higher mass (density) compared to air but have costs that increase exponentially with the type of gas used, xenon being the most expensive. In general, the more effective a fill gas is at its optimum thickness, the thinner the optimum thickness is.

A muntin is technically described as a strip of material (often wood or metal or even plastic) separating and holding panes of glass lites in a window. Muntins are also called "glazing bars", "astragals", "muntin bars," "false muntins" "grilles" or, somewhat confusingly, "mullions". Many companies in the U.S. use the term "grille" when referring to a set of decorative muntin bars added to give a sash the appearance of a "true divided light" sash. In the IGU field decorative muntins IG Assembly Lines IGUs are manufactured on a made-to-order basis on factory production lines, such as the Billco Manufacturing Vertical I.G. line, or the GED Intercept™ IG line or the Lisec Vertical I.G. Line. See also U.S. Pat. Nos. 4,434,024, 4,885,926, 4,961,270, 4,961,816, 5,173,148, 5,394,725, 5,823,732, 5,932,062, 6,038,825, 6,068,720, 6,148,890, 6,279,292, 6,329,030, 6,378,586, 6,609,611, 6,793,971 and U.S. Patent Publication Number 2007-0074803, 2009-0014493 which are incorporated herein by reference and which disclose IGU production lines or related components and/or developments therefore.

In any I.G. assembly line, for each individual IGU, the width and height dimensions of each lite, the thickness of the glass lites, the type of glass for each glass lite, the specific spacer, the inner pane gas (e.g., air, argon, xenon, krypton), if any, and treatment (i.e. partial vacuum level), spacer type, muntin type, if any, must be supplied to the I.G. assembly line. On the I.G. assembly line, spacers of specific thicknesses are cut and assembled into the required overall width and height dimensions and filled with desiccant. On an earlier or upstream glass cutting line, glass panes of the relevant types are cut to size and supplied to the IG line. On the I.G. line the glass lites are washed to be optically clear. An adhesive sealant, such as polyisobutylene or PIB for short, is applied to the face of the spacer on each side and the appropriate lites pressed against the spacer. If the IGU is gas filled, two holes may be drilled into the spacer of the assembled unit, lines are attached to draw out the air out of the space and replaced with the desired gas, with the drilled holes being subsequently sealed. Alternatively the IG line may have what is known as an "online gas filler", which removes the need to drill holes in the spacer. The units are then sealed on the edge side using an outer sealant such as either polysulphide or silicone sealant or similar material to prevent humid outside air from entering the unit. The desiccant will remove traces of humidity from the air space so that no water appears on the inside faces of the glass panes facing the air space during cold weather. Some manufacturers have developed specific processes that combine the spacer and desiccant into a single step application system. Internal or external muntins can be applied on the IG line which may include the drilling of attachment holes in selected locations.

IG Line Control

Existing I.G. lines typically utilize a production control system designed to control the I.G. line processes and to identify or schedule the lites that need to be introduced into the I.G. line. The result of this control system is known as a line schedule. The schedule created will identify what order the specific IGUs will be produced, which in addition to the specific order the lites need to be introduced into the I.G. Line, the schedule will also identify what spacers need to be used for a specific piece, what muntins are to be used, what washing parameters, sealant parameters, gas parameters, and other operating parameters for the I.G. line.

Some of the changes in specific IGUs require time consuming adjustments to be made to the I.G. line. For example, in some I.G. lines, a change in the style or type of spacer used on a designated IGU can cause a delay, typically 2-20 minutes, in the line processing while the spacer type is swapped out in the specific location of the I.G. Changes in the muntin types can often require a change in drilling jigs used on the I.G. line. Changes in the gas type may likewise require a time consuming switch out of items on the I.G. Line. Other IGU types can result in other time consuming change outs on the I.G. line and these examples are merely representative.

Within the meaning of this application an "I.G. assembly line change out" represents any IG assembly line change in stock material or operating parameter that requires the I.G. line to pause for a measurable period of time before continuing to process IGUs. The meaning of an I.G. assembly line change out may be more clear as compared to an "on the fly" parameter (or stock) change between different IGUs. For example a change in glass lite size between IGUs on the IGU assembly line may require only an adjustment of cleaning brush locations which can be shifted between components without pausing the line. An on the fly adjustment of the IG assembly line will define the IGUs as of the same general type. Distinct types of IGUs within the meaning of this application are those that require a IG assembly line change out to be performed between their respective assemblies.

There remains a need in the art to improve the IG Line schedulers to adequately balance the change out requirements with order cycle time efficiency. It is an object of the present invention to improve the efficiencies of IGU production lines incorporating an IG Line Scheduler.

SUMMARY OF THE INVENTION

In accordance with one aspect of the present invention, the present invention, in summary, provides a dynamic insulated glass unit (IGU) assembly line scheduler for production control of an insulated glass unit assembly line. When calculating the IGU assembly order and controls for the IGU assembly line, the scheduler of the invention is configured to evaluate at least i) a changeable set of uniquely identifiable glass lite storage loading locations adjacent the loading station, ii) the changeable set of uniquely identifiable IGU storage locations adjacent the unloading station, iii) the changeable identifiable subset of the set of uniquely identifiable IGU storage locations, and iv) the assembly line change outs to be performed on the IGU assembly line at least in the production of the IGUs for the next in line set of IGUs to be shipped from the IGU assembly line. The scheduler is configured to re-evaluate the IGU assembly order at least with the filling of each next in line set of IGUs to be shipped from the IGU assembly line.

In a more detailed discussion the present invention provides a dynamic insulated glass unit (IGU) assembly line scheduler for production control of an insulated glass unit assembly line, wherein the IGU assembly line is configured to form IGUs of a plurality of distinct types wherein the distinct types require an assembly line change out to be performed on the IGU assembly line when switching from the production of one type of IGU to a distinct type of IGU, with said IGU assembly line scheduler coupled to the IGU assembly line for dynamically scheduling the order of insulated glass units to be manufactured on the IGU assembly line, and wherein the IGU assembly line includes a loading station at a beginning of the IGU assembly line that includes a changeable set of uniquely identifiable glass lite storage loading locations adjacent the loading station, with each storage loading location adapted to receive a glass lite therein for subsequent processing on the IGU assembly line, and wherein the IGU assembly line includes an unloading station at an end of the IGU assembly line that includes a changeable set of uniquely identifiable IGU storage locations adjacent the unloading station with each storage loading location adapted to receive a IGU therein finished from the IGU assembly line, wherein a changeable identifiable subset of the set of uniquely identifiable IGU storage locations adjacent the unloading station defines the next in line set of IGUs to be shipped from the IGU assembly line; wherein the scheduler is configured to evaluate at least i) the changeable set of uniquely identifiable glass lite storage loading locations adjacent the loading station, ii) the changeable set of uniquely identifiable IGU storage locations adjacent the unloading station, iii) the changeable identifiable subset of the set of uniquely identifiable IGU storage locations, and iv) the assembly line change outs to be performed on the IGU assembly line at least in the production of the IGUs for the next in line set of IGUs to be shipped from the IGU assembly line, when calculating the IGU assembly order and controls for the IGU assembly line, and wherein the scheduler is configured to re-evaluate the IGU assembly order at least with the filling of each next in line set of IGUs to be shipped from the IGU assembly line.

The invention may provide that the scheduler is configured to re-evaluate the IGU assembly order at least following every IGU completed.

The invention may further provide that the changeable set of uniquely identifiable IGU storage locations adjacent the unloading station includes at least a plurality of harp racks mounted adjacent the unloading station, with each harp rack having a plurality of identifiable IGU storage loading locations adapted to receive a IGU therein finished from the IGU assembly line, wherein the changeable identifiable subset of the set of uniquely identifiable IGU storage locations adjacent the unloading station is formed by one harp rack.

The dynamic IGU assembly line scheduler may provide that the changeable set of uniquely identifiable IGU storage locations adjacent the unloading station further includes a buffer location with a plurality of uniquely identifiable IGU storage locations, wherein scheduler is configured to identify that finished IGUs from harp racks not yet mounted adjacent the unloading station be placed into the buffer until the associated harp rack is mounted adjacent the unloading station.

The dynamic IGU assembly line scheduler may provide that the assembly line change out include spacer type changes on the IGU assembly line.

The dynamic IGU assembly line scheduler may provide that the changeable set of uniquely identifiable glass lite storage loading locations adjacent the loading station includes at least a plurality of harp racks mounted adjacent the loading station, with each harp rack having a plurality of identifiable glass lite storage loading locations adapted to receive a glass lite therein for forming part of an IGU on the IGU assembly line.

The dynamic IGU assembly line scheduler may provide that the changeable set of uniquely identifiable glass lite storage loading locations adjacent the loading station includes at least a plurality of un-mounted harp racks accessible to the loading station, wherein the un-mounted harp racks are more time consuming to load glass lites from than the mounted harp racks.

The dynamic IGU assembly line scheduler may provide that the scheduler is configured to further evaluate at least the loading time of glass lites from the mounted harp rack positions and the un-mounted harp rack positions when calculating the IGU assembly order and controls for the IGU assembly line.

The dynamic IGU assembly line scheduler may provide that the scheduler includes a user adjustable weighting factor that is adjusted between the extremes of always scheduling the next in line set of IGUs to be shipped from the IGU assembly line and minimizing the assembly line change outs to be performed on the IGU assembly line.

Within the meaning of this application an "IGU assembly order and controls for the IGU assembly line" identify which operations are performed, in what order and or position to perform specified processing steps on given glass work pieces, and on what equipment.

Schedulers, within the meaning of this application, can either be batch schedulers or dynamic schedulers. A Batch scheduler will consider and place each glass work piece (each glass lite or muntin or spacer or the like) within ONLY one schedule, which is run until that schedule or batch is completed. A Batch scheduler will not consider a given glass work piece within two separate schedules. Replacement pieces are considered as distinct pieces for the purpose of this definition as they require a uniquely separate work piece to form these components.

In contrast with a Batch scheduler, a Dynamic scheduler will consider and place at least some of the glass work pieces within multiple schedules. The dynamic term references the ability of the scheduler to "re-optimize" the schedule following a given set of production, such as after each IGU is assembled, whereby the position of an IGU can change in the final production schedule as the scheduler re-schedules. A Dynamic scheduler may be accurately described as utilizing a series of overlapping batches. The leading example of a Dynamic scheduler is the Batch Ban® product for cutting table optimizers from HP3. Another manner of describing and defining the Dynamic scheduler is that in a Dynamic scheduler the pool of inputs of potential IGUs and associated glass work pieces to be scheduled and considered is continuously changing during a production run. This contrasts with a Batch scheduler which utilizes a fixed pool of inputs of potential glass work pieces to be scheduled for that batch production run.

Within the meaning of this application replacement pieces references those work pieces that have been damaged in processing and need to be replaced or remade. The phrase "replacement pieces" is intended to be a generic encompassing term for these components. Replacement pieces are often very critical in plant production, as, for example, a whole order may be held up until a few replacement pieces are formed (cut and processed) to complete the order The present invention attempts to provide a "lean" scheduler of the IG line wherein it will try to get the next orders, or leading racks, of insulated glass units (IGU) complete as fast as possible by biasing the IGU's selected to be assemble based on their outgoing designations such as by rack number. Further the racks or the order of the racks on which the system is working can be changed dynamically as the user sees fit. Users import the racks they want produced in a particular order. The users can then after that at any time import additional or remove existing racks to/from the list of racks and/or change the order in which they want them produced.

In addition the present invention also optimizes the throughput of the IG line by minimizing the number of changeovers or change outs, such as, for example between muntin punches and spacer types needed to produce the IG's. Changeovers or change outs take anywhere from 2-20 minutes as discussed above. The scheduler may select or produce IGU's from later racks (along with pieces from the leading racks) that need the same spacer/muntin types as the ones in the leading racks while making sure that the system still prefers to produce pieces for the leading racks as much as possible. How much the system prefers producing pieces for the leading racks vs minimizing the number of changeovers can be adjusted by the user on the fly using a user adjustable setting.

The particular advantages of the present invention will be described in connection with the attached FIGURE

BRIEF DESCRIPTION OF THE DRAWINGS

FIG. 1 is a schematic plan view of an Insulated Glass Assembly Line using a dynamic, lean Insulated Glass Unit assembly line scheduler according to the present invention.

DETAILED DESCRIPTION OF THE PREFERRED EMBODIMENTS

FIG. 1 schematically illustrates a dynamic, lean Insulated Glass Unit assembly line scheduler 10 according to the present invention. The scheduler 10 is coupled to all of the controllable components of the IG assembly line 12 through conventional connections or couplings 30. The IG assembly line 12 is formed of generally conventional sub-components forming the stations and having a production flow direction 14. The line 12 may preferably be formed as the Billco Manufacturing Vertical I.G. line. Alternatively the invention may incorporate the GED Intercept™ IG line or the Lisec Vertical I.G. Line or other available IG assembly lines. For each individual IGU, all of the specifications of the IGU components must be known and used to properly control the I.G. line. On the I.G. assembly line 12, spacers 16 of specific thicknesses are cut and assembled into the required overall width and height dimensions and possibly filled with desiccant. Distinct spacers 16 are shown as this is one common type of I.G. assembly line change out that is required between distinct IGU types. Internal or external muntins 18 can be applied on the IG line 12 which may include drilling attachment holes in selected locations. Again distinct muntins 18 are schematically shown as this is another type of common cause for a delaying change out.

The dynamic insulated glass unit (IGU) assembly line scheduler 10 provides for production control of the insulated glass unit assembly line 12, wherein the IGU assembly line is configured to form IGUs of a plurality of distinct types wherein the distinct types require an I.G. assembly line change out to be performed on the IGU assembly line when switching from the production of one type of IGU to a distinct type of IGU.

The IGU assembly line 12 includes a loading station represented schematically by worker icon 20 at a beginning of the IGU assembly line 12. The loading station includes a changeable set of uniquely identifiable glass lite storage loading locations adjacent the loading station which is formed by a plurality of harp racks **22*a* and 22*b*, wherein each harp rack 22*a* and 22*b* includes a plurality of uniquely identifiable glass lite storage loading locations. Each storage loading location is configured or adapted to receive a glass lite therein for subsequent processing on the IGU assembly line 12**.

The harp racks **22*a* are a plurality of harp racks "mounted" adjacent the loading station as shown. The term mounted means that the harp racks 22*a* are "easily assessable to the worker 20 (the worker could be replaced with an automatic pick and place type loader as well). The harp racks 22*b* are formed by a plurality of un-mounted harp racks 22*b* accessible to the loading station, wherein the un-mounted harp racks 22*b* are more remote in a "marshaling yard" and thus more time consuming for a worker to load glass lites from than the mounted harp racks 22*a* (and not possible for conventional pick and place robots). The scheduler 10 is configured to evaluate at least the loading time of glass lites from the mounted harp racks 22*a* and the more remote or un-mounted harp racks 22*b* when calculating the IGU assembly order and controls for the IGU assembly line 12**.

A Non-designated lite holder 32 with uniquely identifiable glass lite storage loading locations may also be provided adjacent the loading station. This accommodates lites that do not come from a harp rack **22*a* or 22*b*. For example if a lite breaks in the line 12, other lites forming the associated IGU will be removed and can be stored on the holder 32 in a newly designated position so the worker can easily locate the piece(s) when a recut is brought to the line 12. In a rare circumstance a recut work piece may make it to the line and need to be stored before the reusable lites can be pulled off of the line 12 and thus the recut may need identifiable storage in holder 32. A further possibility is that a piece (or a few) is moved from harp rack 22*a* to holder 32 to allow the harp rack 22*a* to be removed and a new rack (now 22*a***) to be mounted for subsequent processing. The holder gives great flexibility to the control of the overall system while still maintaining identifiable storage locations so that no pieces are lost or unaccounted for.

A monitor 26, with input capabilities, is provided for the worker 20 and is coupled to the scheduler through coupling 28. The monitor will identify the order of inputting glass lites from the harp racks **22*a* and 22*b* and holder 32 (as well as identifying slots to store pieces in holder 32). The input capabilities allow the user to input breakages and other needed input such as line stoppages. Couplings 30 would also have input devices along line 12 for similar data input into scheduler 10**.

The IGU assembly line 12 includes an unloading station represented by worker 40 at an end of the IGU assembly line 12. The unloading station 40 includes a changeable set of uniquely identifiable IGU storage locations formed on harp racks **42*a* that are mounted adjacent the unloading station. Each harp rack 42*a* includes a plurality of storage locations, with each storage loading location adapted to receive a IGU therein finished from the IGU assembly line. Although not every storage location may receive an IGU as an order may only need a partial rack. A changeable identifiable subset of the set of uniquely identifiable IGU storage locations is formed by a leading harp rack 42*a* which is adjacent the unloading station and defines the next in line set of IGUs to be shipped from the IGU assembly line. This rack 42*a* may constitute an order to be filled, although an order may comprise multiple racks as well. In addition a single rack may form two complete orders, but that is not a significant concern for the scheduler 10. In the context of the present invention the scheduler 10 need only identify which rack 42*a*** is next to be filled.

Harp racks **42*b* represent future or un-mounted harp racks not yet accessible to the unloading station. The scheduler 10 may still select IGU for these inaccessible harp racks 42*b* through use of a buffer 52 that contains uniquely identifiable IGU storage locations. The buffer allows the IGU of future harp racks 42*b* to be completed and stored until the harp rack is mounted, and thus becomes a mounted harp rack 42*a*, wherein the IGU can be moved from the buffer 52 to the harp rack 42*a*** position.

A monitor 46, with input capabilities, is provided for the worker 40 and is coupled to the scheduler through coupling 48. The monitor 46 will identify the order of finished IGU into the harp racks **42*a* or buffer 52 (as well as identifying slots in buffer 52 to move an IGU to a newly mounted rack 42*a***).

When calculating the IGU assembly order and controls for the IGU assembly line, the scheduler is configured to evaluate at least i) the changeable set of uniquely identifiable glass lite storage loading locations adjacent the loading station (i.e. the harp racks **22*a*, 22*b* and holder 32), ii) the changeable set of uniquely identifiable IGU storage locations adjacent the unloading station (i.e. the harp racks 42*a* and buffer 52), the changeable identifiable subset of the set of uniquely identifiable IGU storage locations (the leading or next in line harp rack 42***a*), and iv) the assembly line change outs to be performed on the IGU assembly line at least in the production of the IGUs for the next in line set of IGUs to be shipped from the IGU assembly line.

Further, the scheduler 10 is configured to re-evaluate the IGU assembly order at least with the filling of each next in line set of IGUs to be shipped from the IGU assembly line, and preferably the scheduler is configured to re-evaluate the IGU assembly order at least following every IGU completed.

In short summary the scheduler 10 will schedule all of the IGUs in the leading harp rack 42*a* that do not require a change out based upon the available lites at the input in harp racks 22*a* (and possibly 22*b* and holder 32). However, although the scheduler 10 or system prefers to produce IGUs for the leading racks as much as possible, when a distinct type of IGU is called for the system will balance the need to finish the leading rack with the need to minimize changeover. How much the system prefers producing IGUs for the leading racks vs minimizing the number of changeovers can be adjusted by the user on the fly using a user adjustable setting. In a similar fashion the use of a more remotely available piece from 22*b* can be adjustably weighted by the user to increase the "penalty" or severity of the delay caused from obtaining a remotely available piece.

There are numerous algorithms for weighting or penalizing or selectively balancing these considerations that are well known to those in the art, and any acceptable method can be used in this context.

Although the present invention has been described with particularity herein, the scope of the present invention is not limited to the specific embodiment disclosed. It will be apparent to those of ordinary skill in the art that various modifications may be made to the present invention without departing from the spirit and scope thereof.

What is claimed is:

1. A dynamic insulated glass unit (IGU) assembly line scheduler for production control of an IGU assembly line, wherein the IGU assembly line is configured to form IGUs of a plurality of distinct types wherein the distinct types require an IGU assembly line change out to be performed on the IGU assembly line when switching from the production of one type of IGU to a distinct type of IGU, said IGU assembly line scheduler coupled to the IGU assembly line for dynamically scheduling the order of IGUs to be manufactured on the IGU assembly line, wherein the IGU assembly line includes a loading station at a beginning of the IGU assembly line that includes a changeable set of uniquely identifiable glass lite storage loading locations adjacent the loading station, with each storage loading location adapted to receive a glass lite therein for subsequent processing on the IGU assembly line, wherein the IGU assembly line includes an unloading station at an end of the IGU assembly line that includes a changeable set of uniquely identifiable IGU storage locations adjacent the unloading station with each storage loading location adapted to receive a IGU therein finished from the IGU assembly line, wherein a changeable identifiable subset of the set of uniquely identifiable IGU storage locations adjacent the unloading station defines the next in line set of IGUs to be shipped from the IGU assembly line;

wherein the scheduler is configured to calculate the IGU assembly order and controls for the IGU assembly line, wherein during the calculation the scheduler is configures to evaluate at least i) the changeable set of uniquely identifiable glass lite storage loading locations adjacent the loading station, ii) the changeable set of uniquely identifiable IGU storage locations adjacent the unloading station, iii) the changeable identifiable subset of the set of uniquely identifiable IGU storage locations, and iv) the assembly line change outs to be performed on the IGU assembly line at least in the production of the IGUs for the next in line set of IGUs to be shipped from the IGU assembly line, and wherein the scheduler is configured to re-evaluate the IGU assembly order at least with the filling of each next in line set of IGUs to be shipped from the IGU assembly line.

2. The dynamic IGU assembly line scheduler according to claim 1 wherein the scheduler is configured to re-evaluate the IGU assembly order at least following every IGU completed.

3. The dynamic IGU assembly line scheduler according to claim 1 wherein the changeable set of uniquely identifiable IGU storage locations adjacent the unloading station includes at least a plurality of harp racks mounted adjacent the unloading station, with each harp rack having a plurality of identifiable IGU storage loading locations adapted to receive a IGU therein finished from the IGU assembly line, wherein the changeable identifiable subset of the set of uniquely identifiable IGU storage locations adjacent the unloading station is formed by one harp rack.

4. The dynamic IGU assembly line scheduler according to claim 3 wherein the changeable set of uniquely identifiable IGU storage locations adjacent the unloading station further includes a buffer location with a plurality of uniquely identifiable IGU storage locations, wherein scheduler is configured to identify that finished IGUs from harp racks not yet mounted adjacent the unloading station be placed into the buffer until the associated harp rack is mounted adjacent the unloading station.

5. The dynamic IGU assembly line scheduler according to claim 4 wherein the assembly line change out include spacer type changes on the IGU assembly line.

6. The dynamic IGU assembly line scheduler according to claim 5 wherein the changeable set of uniquely identifiable glass lite storage loading locations adjacent the loading station includes at least a plurality of harp racks mounted adjacent the loading station, with each harp rack having a plurality of identifiable glass lite storage loading locations adapted to receive a glass lite therein for forming part of an IGU on the IGU assembly line.

7. The dynamic IGU assembly line scheduler according to claim 6 wherein the changeable set of uniquely identifiable glass lite storage loading locations adjacent the loading station includes at least a plurality of un-mounted harp racks accessible to the loading station, wherein the un-mounted harp racks are more time consuming to load glass lites from than the mounted harp racks.

8. The dynamic IGU assembly line scheduler according to claim 7 wherein the scheduler is configured to further evaluate at least the loading time of glass lites from the mounted harp rack positions and the un-mounted harp rack positions when calculating the IGU assembly order and controls for the IGU assembly line.

9. The dynamic IGU assembly line scheduler according to claim 8 wherein the scheduler includes a user adjustable weighting factor that is adjusted between the extremes of always scheduling the next in line set of IGUs to be shipped from the IGU assembly line and minimizing the assembly line change outs to be performed on the IGU assembly line.

10. The dynamic IGU assembly line scheduler according to claim 1 wherein the scheduler includes a user adjustable weighting factor that is adjusted between the extremes of always scheduling the next in line set of IGUs to be shipped from the IGU assembly line and minimizing the assembly line change outs to be performed on the IGU assembly line.

11. The dynamic IGU assembly line scheduler according to claim 1 wherein the changeable set of uniquely identifiable glass lite storage loading locations adjacent the loading station includes at least a plurality of harp racks mounted adjacent the loading station, with each harp rack having a plurality of identifiable glass lite storage loading locations adapted to receive a glass lite therein for forming part of an IGU on the IGU assembly line.

12. The dynamic IGU assembly line scheduler according to claim 11 wherein the changeable set of uniquely identifiable glass lite storage loading locations adjacent the loading station includes at least a plurality of un-mounted harp racks accessible to the loading station, wherein the un-mounted harp racks are more time consuming to load glass lites from than the mounted harp racks.

13. The dynamic IGU assembly line scheduler according to claim 12 wherein the scheduler is configured to further evaluate at least the loading time of glass lites from the mounted harp rack positions and the un-mounted harp rack positions when calculating the IGU assembly order and controls for the IGU assembly line.

14. A dynamic insulated glass unit (IGU) assembly line scheduler for production control of an IGU assembly line, wherein the IGU assembly line is configured to form IGUs of a plurality of distinct types wherein the distinct types require an assembly line change out to be performed on the IGU assembly line when switching from the production of one type of IGU to a distinct type of IGU, said IGU assembly line scheduler coupled to the IGU assembly line for dynamically scheduling the order of IGU to be manufactured on the IGU assembly line, wherein the IGU assembly line includes a loading station at a beginning of the IGU assembly line that includes a changeable set of uniquely identifiable glass lite storage loading locations adjacent the loading station formed by at least a plurality of harp racks adjacent the loading station with each harp rack having a plurality of glass lite storage locations, with each storage loading location adapted to receive a glass lite therein for subsequent processing on the IGU assembly line, wherein the IGU assembly line includes an unloading station at an end of the IGU assembly line that includes a changeable set of uniquely identifiable IGU storage locations adjacent the unloading station with each storage loading location adapted to receive a IGU therein finished from the IGU assembly line, with the changeable set of IGU storage locations formed at least by harp racks each having a plurality of storage locations, wherein a changeable identifiable subset of the set of uniquely identifiable IGU storage locations adjacent the unloading station formed by one harp rack defines the next in line set of IGUs to be shipped from the IGU assembly line;

wherein the scheduler is configured to calculate the IGU assembly order and controls for the IGU assembly line, wherein during the calculation the scheduler is configures to evaluate at least i) the changeable set of uniquely identifiable glass lite storage loading locations adjacent the loading station, ii) the changeable set of uniquely identifiable IGU storage locations adjacent the unloading station, iii) the changeable identifiable subset of the set of uniquely identifiable IGU storage locations, and iv) the assembly line change outs to be performed on the IGU assembly line at least in the production of the IGUs for the next in line set of IGUs to be shipped from the IGU assembly line, and wherein the scheduler is configured to re-evaluate the IGU assembly order at least with the filling of each next in line set of IGUs to be shipped from the IGU assembly line.

15. A dynamic insulated glass unit (IGU) assembly line scheduler for production control of an IGU assembly line, wherein the scheduler is configured to calculate the IGU assembly order and controls for the IGU assembly line, wherein during the calculation the scheduler is configures to evaluate at least the following:

i) A changeable set of uniquely identifiable glass lite storage loading locations adjacent the loading station, ii) A changeable set of uniquely identifiable IGU storage locations adjacent the unloading station, iii) A changeable identifiable subset of the set of uniquely identifiable IGU storage locations, and assembly line change outs to be performed on the IGU assembly line at least in the production of the IGUs for the next in line set of IGUs to be shipped from the IGU assembly line;

wherein the scheduler is configured to re-evaluate the IGU assembly order at least following every IGU completed;

wherein the changeable set of uniquely identifiable IGU storage locations adjacent the unloading station includes at least a plurality of harp racks mounted adjacent the unloading station, with each harp rack having a plurality of identifiable IGU storage loading locations adapted to receive a IGU therein finished from the IGU assembly line, wherein the changeable identifiable subset of the set of uniquely identifiable IGU storage locations adjacent the unloading station is formed by one harp rack;

wherein the changeable set of uniquely identifiable glass lite storage loading locations adjacent the loading station includes at least a plurality of harp racks mounted adjacent the loading station, with each harp rack having a plurality of identifiable glass lite storage loading locations adapted to receive a glass lite therein for forming part of an IGU on the IGU assembly line;

wherein the changeable set of uniquely identifiable glass lite storage loading locations adjacent the loading station includes at least a plurality of un-mounted harp racks accessible to the loading station, wherein the un-mounted harp racks are more time consuming to load glass lites from than the mounted harp racks; and wherein the scheduler is configured to further evaluate at least the loading time of glass lites from the mounted harp rack positions and the un-mounted harp rack positions when calculating the IGU assembly order and controls for the IGU assembly line.

* * * * *